US008927075B2

(12) United States Patent
Gibanel et al.

(10) Patent No.: US 8,927,075 B2
(45) Date of Patent: Jan. 6, 2015

(54) FOOD AND BEVERAGE CONTAINERS AND METHODS OF COATING

(75) Inventors: Sebastien Gibanel, Chalon sur Saone (FR); Robert Lespinasse, Boyer (FR); Georges Sion, Mancey (FR); Benoit Prouvost, L'Abergement de Cuisery (FR); Paul Stenson, Richterswil (CH)

(73) Assignee: Valspar Sourcing, Inc., Minneapolis, MN (US)

( * ) Notice: Subject to any disclaimer, the term of this patent is extended or adjusted under 35 U.S.C. 154(b) by 731 days.

(21) Appl. No.: 12/405,889

(22) Filed: Mar. 17, 2009

(65) Prior Publication Data

US 2010/0068433 A1 Mar. 18, 2010

Related U.S. Application Data

(63) Continuation-in-part of application No. PCT/US2007/078727, filed on Sep. 18, 2007.

(60) Provisional application No. 60/826,103, filed on Sep. 19, 2006.

(51) Int. Cl.
*B32B 1/00* (2006.01)
*B65D 1/40* (2006.01)
*C09D 133/06* (2006.01)
*C09D 5/02* (2006.01)
*C09D 163/00* (2006.01)
*C08L 33/00* (2006.01)
*C08L 63/00* (2006.01)

(52) U.S. Cl.
CPC .............. *C09D 133/068* (2013.01); *C09D 5/02* (2013.01); *C09D 163/00* (2013.01); *C08L 33/00* (2013.01); *C08L 63/00* (2013.01)
USPC ................... 428/35.7; 220/62.11; 220/62.12; 220/62.13

(58) Field of Classification Search
CPC .... C09D 5/02; C09D 133/068; C09D 163/00; C08L 33/00; C08L 63/00; C08L 2666/04
USPC ........................................................ 428/35.7
See application file for complete search history.

(56) References Cited

U.S. PATENT DOCUMENTS

| | | | |
|---|---|---|---|
| 3,107,226 A | 10/1963 | Tonner et al. | |
| 4,021,396 A | 5/1977 | Wu | |
| 4,059,550 A | 11/1977 | Shimp | |
| 4,111,870 A * | 9/1978 | Den Hartog et al. | 428/414 |
| 4,212,781 A | 7/1980 | Evans et al. | |
| 4,223,165 A | 9/1980 | Jouffret | |
| 4,247,439 A | 1/1981 | Matthews et al. | |
| 4,285,847 A | 8/1981 | Ting | |
| 4,302,373 A | 11/1981 | Steinmetz | |
| 4,304,701 A * | 12/1981 | Das et al. | 524/460 |
| 4,305,859 A | 12/1981 | McEwan et al. | |
| 4,308,185 A | 12/1981 | Evans et al. | |
| 4,313,886 A * | 2/1982 | Massingill | 549/517 |
| 4,399,241 A | 8/1983 | Ting et al. | |
| 4,423,165 A | 12/1983 | Harper et al. | |
| 4,442,246 A | 4/1984 | Brown et al. | |
| 4,476,263 A | 10/1984 | Owens | |
| 4,480,058 A | 10/1984 | Ting et al. | |
| 4,482,673 A | 11/1984 | Brown et al. | |
| 4,487,861 A | 12/1984 | Winner | |
| 4,503,173 A | 3/1985 | Martino et al. | |
| 4,522,961 A | 6/1985 | Martino et al. | |
| 4,547,535 A | 10/1985 | Brown et al. | |
| 4,585,813 A | 4/1986 | Brown et al. | |
| 4,647,680 A * | 3/1987 | Barfurth et al. | 556/40 |
| 4,963,602 A | 10/1990 | Patel | |
| 5,025,063 A | 6/1991 | Craun et al. | |
| 5,036,134 A | 7/1991 | Kunz et al. | |
| 5,051,470 A | 9/1991 | Woo et al. | |
| 5,093,392 A | 3/1992 | Woo et al. | |
| 5,116,888 A | 5/1992 | Woo et al. | |
| 5,157,078 A | 10/1992 | Woo et al. | |
| 5,162,427 A | 11/1992 | Craun et al. | |
| 5,196,481 A | 3/1993 | Owens et al. | |
| 5,201,436 A | 4/1993 | Owens et al. | |
| 5,212,241 A | 5/1993 | Woo et al. | |
| 5,238,987 A | 8/1993 | Bodwell et al. | |
| 5,252,637 A | 10/1993 | Craun et al. | |
| 5,260,356 A | 11/1993 | Craun et al. | |
| 5,500,463 A | 3/1996 | Nishimura et al. | |

(Continued)

FOREIGN PATENT DOCUMENTS

| | | |
|---|---|---|
| EP | 1788041 A1 | 5/2007 |
| KR | 101999087121 A | 12/1999 |
| WO | WO-03/076530 | 9/2003 |

OTHER PUBLICATIONS

General Organic Chemistry, by William Stickler, 1960, p. 348.*
International Search Report and Written Opinion for PCT/US2007/078727 dated Mar. 20, 2008 (10 pages).
International Preliminary Report on Patentability for PCT/US2007/078727 dated Apr. 2, 2009 (10 pages).
Examiner's First Report dated May 23, 2012 from Australian Patent Application No. 2007297378.
Korean Notice of Preliminary Rejection dated Nov. 14, 2013 for corresponding Korean Patent Application No. 10-2009-7005524, filed Mar. 18, 2009.

*Primary Examiner* — Gwendolyn Blackwell
*Assistant Examiner* — Susan Dye
(74) *Attorney, Agent, or Firm* — Brian R. Morrison; Westman, Champlin & Koehler, P.A.

(57) ABSTRACT

Food and beverage containers and methods of coating are provided. The food and beverage containers include a metal substrate that is at least partially coated with a coating composition that includes a water-dispersible resin system and an aqueous carrier. The resin system includes an epoxy component and an acrylic component. In a preferred embodiment, the coating composition is at least minimally retortable when cured.

20 Claims, No Drawings

(56) References Cited

U.S. PATENT DOCUMENTS

| | | |
|---|---|---|
| 5,830,952 A | 11/1998 | Pedersen et al. |
| 5,840,384 A | 11/1998 | Noda et al. |
| 5,869,552 A | 2/1999 | Pedersen et al. |
| 5,922,817 A * | 7/1999 | Pedersen et al. ............... 525/531 |
| 5,972,432 A | 10/1999 | Chutko et al. |
| 6,306,934 B1 * | 10/2001 | Bode et al. .................... 523/412 |
| 6,514,619 B2 * | 2/2003 | Shimada et al. ............... 428/418 |
| 6,558,480 B1 | 5/2003 | Rochfort et al. |
| 6,576,689 B2 | 6/2003 | Noda et al. |
| 6,808,752 B2 | 10/2004 | Mallen |
| 7,037,584 B2 | 5/2006 | Wind et al. |
| 2004/0131784 A1 | 7/2004 | Bode et al. |
| 2005/0115902 A1 * | 6/2005 | Kaleem et al. ................ 210/650 |
| 2007/0087146 A1 | 4/2007 | Evans et al. |

\* cited by examiner

FOOD AND BEVERAGE CONTAINERS AND METHODS OF COATING

CROSS REFERENCE TO RELATED APPLICATION

This application is a continuation-in-part of PCT/US2007/078727, with an international filing date of Sep. 18, 2007, by Gibanel et. al. and entitled "Food and Beverage Containers and Methods of Coating" and claims the benefit of U.S. Provisional Application No. 60/826,103 filed on Sep. 19, 2006 by Gibanel et. al., and entitled "Food and Beverage Containers and Methods of Coating," each of which is incorporated herein by reference in its entirety.

TECHNICAL FIELD

This invention relates generally to packaging articles. More specifically, the present invention relates to food and beverage containers and coating compositions for use thereon.

BACKGROUND

A wide variety of coatings are used to coat both the interior and/or exterior surfaces of packaging articles. The coatings serve a variety of functions that may vary depending on factors such as, for example, the nature of the packaging article, the nature of the good to be packed within the packaging article, and the nature of the substrate onto which the coating is to be applied. Such coatings are frequently applied to the interior of metal food or beverage containers to prevent or retard the interaction of food or beverage products with metal substrates of the containers.

A variety of manufacturing processes are used to apply such coatings to substrates. For example, portions of metal cans are sometimes coated using "coil coating" or "sheet coating" operations, in which a planar coil or sheet of a suitable substrate is coated with a suitable composition and hardened. The coated substrate is then formed into a can end or body. Alternatively, liquid-coating compositions may be applied (e.g., by spraying, dipping, rolling, etc.) to the formed article and then hardened.

Coatings for packaging applications should preferably be capable of high-speed application to the substrate and provide the necessary properties when hardened to perform in this demanding end use. For example, in some applications, the coatings should have excellent adhesion to the substrate, resist degradation over extended periods of time, and be safe for food contact (for applications requiring such contact), even when exposed to harsh environments.

The food and beverage packaging industry has increasingly employed water-based coating systems in place of organic solvent-based coating systems. Significant problems have been encountered, however, when utilizing conventional water-based coating systems in food or beverage applications that require preservation or sterilization of food or beverage products (e.g., through elevated temperature and pressure conditions). Such problems may include, for example, corrosion of the coating, absorption of water into the coating, staining or discoloring of the coating, and/or loss of adhesion of the coating with the underlying substrate. Moreover, packaged food or beverage products frequently exhibit aggressive chemical properties that may damage conventional water-based coating systems, especially when combined with the elevated temperatures of preservation or sterilization conditions.

Thus, there is a continuing need for improved water-based coating systems that resist such degradation.

SUMMARY

In one embodiment, the present invention provides a coated article that comprises a food or beverage container or a portion thereof. The coated article includes a metal substrate and a coating composition applied to at least a portion of the metal substrate. The coating includes an aqueous carrier and a water-dispersible resin system that includes (i) an epoxy component and (ii) an acrylic component preferably having a Tg of at least about 40° C. Preferably, when the coating composition is cured to form a cured coating, the cured coating is at least minimally retortable.

In another embodiment, the present invention provides a coating composition described herein.

In yet another embodiment, the present invention provides a method for forming a food or beverage container described herein, or a portion thereof. The method includes preparing a coating composition described herein, applying the coating composition to a metal substrate, and curing the coating composition to form a cured coating that is at least minimally retortable.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

The details of one or more embodiments of the invention are set forth in the description below. Other features, objects, and advantages of the invention will be apparent from the description and from the claims.

DEFINITIONS

Unless otherwise specified, the following terms used in this specification have the meanings provided below.

The term "acrylic component" includes any compound, polymer, or organic group formed from, or containing, an acrylate or methacrylate compound (e.g., acrylic or methacrylic acid and esters thereof). As discussed in further detail below, the acrylic component may also additionally be formed from, or contain, one or more other vinyl monomers.

The term "epoxy component" includes any compound, polymer, or organic group that contains an epoxy group or is formed from a compound containing an epoxy group.

The term "crosslinker" refers to a molecule capable of forming a covalent linkage between two polymers or between two different regions of the same polymer.

The terms "Adhesion Test," "Blush Resistance Test," "Stain Resistance Test," and "Porosity Test" refer, respectively, to the adhesion, blush resistance, stain resistance, and porosity test methodologies described in the Test Methods section below. The Adhesion Test, Blush Resistance Test, Stain Resistance Test, and Porosity Test are collectively referred to as the "Coating Property Tests." Each of these respective tests is by definition performed after a coating composition of the present invention is suitably cured and retorted pursuant to the retort method (hereinafter "Retort Method") included in the Test Methods section below.

The term "non-functional monomer" refers to ethylenically unsaturated monomers that do not contain functional groups that are reactive with crosslinking agents, and especially aminoplast and/or phenoplast crosslinking agents. Examples of such reactive functional groups are pendant carboxylic, hydroxyl, and amine groups.

The term "organic group" means a hydrocarbon group (with optional elements other than carbon and hydrogen, such as oxygen, nitrogen, sulfur, and silicon) that is classified as an aliphatic group, cyclic group, or combination of aliphatic and cyclic groups (e.g., alkaryl and aralkyl groups). The term "aliphatic group" means a saturated or unsaturated linear or branched hydrocarbon group. This term is used to encompass alkyl, alkenyl, and alkynyl groups, for example. The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "alkenyl group" means an unsaturated, linear or branched hydrocarbon group with one or more carbon-carbon double bonds, such as a vinyl group. The term "alkynyl group" means an unsaturated, linear or branched hydrocarbon group with one or more carbon-carbon triple bonds.

A group that may be the same or different is referred to as being "independently" something. Substitution is anticipated on the organic groups of the compounds of the present invention. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, for example, "alkyl group" includes ether groups, haloalkyls, nitroalkyls, carboxyalkyls, hydroxyalkyls, sulfoalkyls, etc.

The term "water-dispersible" in the context of a water-dispersible polymer means that the polymer can be mixed into water (or an aqueous carrier) to form a stable mixture. For example, a mixture that readily separates into immiscible layers is not a stable mixture. The term "water-dispersible" is intended to include the term "water-soluble." In other words, by definition, a water-soluble polymer is also considered to be a water-dispersible polymer.

The term "dispersion" in the context of a dispersible polymer refers to the mixture of a dispersible polymer and a carrier. The term "dispersion" is intended to include the term "solution."

The term "food-contact surface" refers to a surface of an article (e.g., a food or beverage container) that is in contact with, or intended for contact with, a food or beverage product.

The term "retort" generally refers to conditions associated with food or beverage preservation or sterilization that include a temperature of 100° C. or higher. To achieve temperatures higher than 100° C., conditions associated with retort also frequently include pressures in excess of atmospheric pressure. The term "retortable" generally refers to the ability of a coating to withstand exposure to one or more such conditions and still exhibit one or more suitable film or coating properties.

The term "easy open end" refers to a can end (typically an end of a food or beverage container) that includes (i) a frangible opening portion (which for some beverage can ends functions as a drinking spout) and (ii) a riveted portion for attaching a pull tab thereto for purposes of opening the frangible opening portion to access the product housed within a can or container.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "an" amine can be interpreted to mean that the coating composition includes "one or more" amines.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

DETAILED DESCRIPTION

The present invention provides a food or beverage container, or a portion thereof, that includes a metal substrate, wherein at least a portion of the metal substrate is coated with a coating prepared from a composition including a resin system, an aqueous carrier, an optional crosslinker, and an optional catalyst. Preferred resin systems of the present invention include an epoxy component and an acrylic component, and are typically dispersible in an aqueous carrier.

The present invention also provides a method of coating a food or beverage container or a portion thereof. The method including: forming a composition described herein and applying the composition to a metal substrate prior to, or after, forming the metal substrate into a food or beverage container or a portion thereof. The metal substrate is a metal typically used in the food and beverage packaging industry. Preferably, the metal substrate includes steel, aluminum, or a combination thereof.

Coating compositions of the present invention may be suitable for forming coatings on internal and/or external surfaces of food and beverage containers. Preferred coating compositions of the present invention are particularly suited for use on food-contact surfaces, including beer and beverage can ends (also referred to as easy open ends). The coating compositions may be useful in forming coatings that prevent or retard interaction of food or beverage products with underlying substrate materials (e.g., metal). The coating compositions may also be useful in forming protective coatings, aesthetic coatings, wash coatings, size coatings, varnishes, sheet coatings, side-seam coatings, and combinations and variations thereof.

Cured coatings of the present invention are preferably retortable when employed in food and beverage container applications. Preferred cured coatings of the present invention preferably withstand elevated temperature conditions frequently associated with retort processes or other food or beverage preservation or sterilization processes. Particularly preferred cured coatings exhibit enhanced resistance to such conditions while contacting food or beverage products that exhibit one or more aggressive (or corrosive) chemical properties under such conditions. Examples of such food or beverage products may include milk-based products, fruit-based products, energy drinks, and acidic or acidified products.

In some embodiments, cured coatings of the present invention can withstand exposure, for a suitable time period (e.g., for between at least about 10 seconds and about 90 minutes), to temperatures of at least about 80° C., more preferably at least about 100° C., and even more preferably at least about 120° C., while still exhibiting suitable film or coating properties (as defined, for example, by the ability to satisfy one or more suitable chemical or mechanical property tests such as one or more of the Coating Property Tests included herein). In addition, some of these preferred cured coatings can further withstand being exposed to conditions that include one of the above temperatures in combination with pressures of at least about 0.5 atm above atmospheric pressure and more preferably at least about 1.0 atm above atmospheric pressure, while still exhibiting suitable film or coating properties (as defined, for example, by the ability to satisfy one or more suitable chemical or mechanical property tests such as one or more of the Coating Property Tests).

As discussed above, suitably cured coating compositions of the present invention can preferably withstand being subjected to retort processes while contacting food or beverage products having one or more aggressive chemical properties. For example, cured coating compositions of the present invention preferably can withstand being retorted in one or more of the following substances A-E pursuant to the Retort Method:

A. 0.4 wt-% citric acid in water;
B. 1 wt-% citric acid in water;
C. 2 wt-% citric acid in water;
D. Acidified coffee; and/or
E. GATORADE beverage product.

Preferably, coating compositions of the present invention, after being suitably cured and retorted (pursuant to the Retort Method) in one of substances A-E, are capable of satisfying one or more of the Coating Property Tests. Some embodiments of the coating compositions of the present invention are capable of passing all of the Coating Property Tests for one or more substances A-E.

Preferred coating compositions of the present invention, when suitably cured, are capable of forming coatings that are at least minimally retortable. As used herein, the term "minimally retortable" refers to coatings that satisfy one or both of the Adhesion Test and the Porosity Test for at least one of substances A-E (after being retorted in one of substances A-E pursuant to the Retort Method).

More preferred coating compositions of the present invention, when suitably cured, are capable of forming coatings that are substantially retortable. As used herein the term "substantially retortable" refers to coatings that satisfy the Adhesion Test for at least (i) substance B or (ii) substance A and one or more of substances D or E (after being retorted in each of the respective substances A-E pursuant to the Retort Method).

Even more preferred coating compositions of the present invention, when suitably cured, are capable of forming coatings that are generally retortable. As used herein the term "generally retortable" refers to coatings that satisfy the Adhesion Test for at least (i) substance C or (ii) substance B and one or more of substances D or E (after being retorted in each of the respective substances pursuant to the Retort Method).

Optimal coating compositions of the present invention, when suitably cured, are capable of forming coatings that are broadly retortable. As used herein the term "broadly retortable" refers to coatings that satisfy the Adhesion Test for at least substance C and the Porosity Test for at least substance B (after being retorted in each respective substance A-E pursuant to the Retort Method).

Particularly optimal coating compositions of the present invention, when suitably cured, are capable of forming coatings that are fully retortable. As used herein the term "fully retortable" refers to coatings that satisfy (i) the Adhesion Test for at least substances C, D, and E and (ii) the Porosity Test for at least substance B (after being retorted in each respective substance A-E pursuant to the Retort Method).

The epoxy and acrylic components of the coating compositions of the present invention may be present in the resin system in any suitable form that achieves the desired film or coating properties. For example, in some embodiments, the epoxy and the acrylic components may each be present as (i) one or more portions of a polymer of the resin system and/or (ii) one or more portions of separate polymers of the resin system. In some embodiments, the resin system includes a graft polymer having one or more pendant groups attached to a backbone. In one preferred embodiment, a backbone of the graft polymer includes one or more acrylic components with one or more pendant epoxy components attached to the backbone. A linking group may optionally be included to covalently link the epoxy component and the acrylic component through the linking group.

While not intending to be bound by theory, in some embodiments the use of a linking group to covalently link the acrylic and epoxy components may enhance the flexibility of cured coating compositions of the present invention, while direct grafting of the acrylic and epoxy components (e.g., through use of a free-radical initiator) may enhance the retortability of cured coating compositions of the present invention. In some embodiments, it may be desirable to have a suitable combination of both of the above linkage types to produce cured coatings that exhibit a desired blend of film or coating properties.

In preferred embodiments, the acrylic component is covalently linked to the epoxy component via a carbon-carbon bond (as opposed, e.g., to an ester bond), typically a carbon-carbon single bond.

The resin system of the present invention preferably has a number average molecular weight ($M_n$) of at least about 3,000, more preferably at least about 4,500, and even more preferably at least about 5,500. In preferred embodiments, the resin system has a $M_n$ of less than about 50,000, more preferably less than about 45,000, and even more preferably less than about 40,000. In a presently preferred embodiment, the $M_n$ of the resin system is between about 10,000 and about 16,000, and even more preferably is about 14,000.

Polymers of the resin system of the present invention may exhibit any suitable acid number. Acid numbers are typically expressed as milligrams of KOH required to titrate a sample to a specified end point. Methods for determining acid numbers are well known in the art. See, for example, ASTM D 974-04 entitled "Standard Test Method for Acid and Base Number by Color-Indicator Titration" and available from the American Society for Testing and Materials International of West Conshohocken, Pa. In some embodiments, the resin system preferably has an acid number of between about 20 and about 150, more preferably between about 40 and about 120, and even more preferably between about 60 and about 90. In a particularly preferred embodiment, the resin system of the present invention has an acid number of about 70.

The epoxy component of the resin system is preferably formed from an epoxy compound (or a mixture of epoxy compounds) that contains at least one epoxy group, and more preferably has an average of between about 1.5 to about 2.5 epoxy groups per molecule of the epoxy compound. In a preferred embodiment, the epoxy component is formed from an epoxy compound having about two epoxy groups per molecule of the epoxy compound.

Suitable epoxy compounds have an epoxy equivalent weight (EEW) of preferably at least about 180, more preferably at least about 1,500, and most preferably at least about 2,500. Moreover, suitable epoxy compounds have an EEW of preferably less than about 25,000, more preferably less than about 22,500, and most preferably less than about 20,000. In a presently preferred embodiment, an epoxy compound having an EEW of between about 5,000 and about 8,000 is used, with an epoxy compound having an EEW of 7,000 being particularly preferred.

The epoxy compound can be any suitable epoxy compound to elicit a desired coating or film property. The epoxy compound is preferably a linear epoxy resin with one or more terminal epoxy groups. The epoxy compound may be aliphatic or aromatic. Suitable epoxy compounds include aromatic compounds such as, for example, epoxy resins based on the diglycidyl ether of bisphenol A ("BADGE"). The epoxy compound can be used in a commercially available form, or can be prepared by advancing a low molecular weight epoxy compound by standard methods. For example, an epoxy compound having an EEW of about 180 to about 500 can be advanced with a suitable amount of a dihydric phenol (e.g., bisphenol A ("BPA")) to produce an epoxy compound having an EEW of between about 1,000 and about 12,000. Alternatively, any suitable difunctional compound (or mixture of compounds) capable of reacting with the oxirane groups may be employed. Examples of such compounds may include diacids such as, e.g., sebacic, adipic, azelaic, and dimer fatty acids (e.g., saturated and/or unsaturated dimer fatty acids, more preferably saturated); amines or diamines such as, e.g., butylamine, ethylenediamine, and hexamethylene diamine; amino acids such as, e.g., alanine, lysine, and aminododecanoic acid; diols; and mixtures and variations thereof. In one embodiment, the epoxy component is a reaction product of an epoxy compound, a dihydric phenol, and a dimer fatty acid. Such compounds may be used in any suitable amount. In some embodiments, the epoxy component includes from about 1 to about 10% by weight of one or more such difunctional compounds.

In some embodiments, the epoxy compound may be upgraded using non-BPA containing dihydric phenols (e.g., bis-4-hydroxy benzoate of 1,4-cyclohexane dimethanol) such as, for example, those described in U.S. application Ser. No. 11/550,451 (now published as US 200700871465), which is incorporated herein by reference. In some such embodiments, the resulting epoxy compound is free of bound and/or extractible BPA.

Examples of suitable epoxy compounds include DER 331, DER 664, DER 667, DER 668, and DER 669 (all commercially available from Dow Chemical Co., Midland, Mich.); and EPON 828, EPON 1004, EPON 1007, and EPON 1009 (all commercially available from Shell Chemical Co., Houston, Tex.). EPON 828 and DER 331 are preferred low molecular weight epoxy compounds that may be used in commercial form or advanced with a dihydric phenol (e.g., BPA).

The resin system of the present invention preferably includes at least about 5 wt-%, more preferably at least about 25 wt-%, and even more preferably at least about 60 wt-% of epoxy compound, based on the dry (i.e., nonvolatile) weight of the resin system. Moreover, the resin system of the present invention preferably includes less than about 95 wt-%, more preferably less than about 90 wt-%, and most preferably less than about 85 wt-% of epoxy compound, based on the dry weight of the resin system.

In a preferred embodiment, one or more quaternary ammonium salt groups are included in the resin system through reaction of a neutralizing agent (e.g., a tertiary amine) and an epoxy group (i.e., oxirane group) of the epoxy component. For further discussion of quaternary ammonium salt groups, see, for example, U.S. Pat. No. 4,302,373. While not intending to be bound by theory, the quaternary ammonium salt group is thought to enhance dispersibility of the resin system in an aqueous carrier and/or compatibilization of the epoxy and acrylic components of the resin system.

The coating composition of the invention may include any amount of acrylic component suitable to produce the desired film or coating properties. In preferred embodiments, the coating composition preferably includes an amount of acrylic component of at least about 5 wt-%, more preferably at least about 10 wt-%, and even more preferably at least about 15 wt-%, as determined by an amount of a monomer mixture used to prepare the acrylic component and based on the total dry weight of the resin system. In preferred embodiments, the coating composition preferably includes an amount of acrylic component of less than about 95 wt-%, more preferably less than about 75 wt-%, and even more preferably less than about 40 wt-%, as determined by an amount of a monomer mixture used to prepare the acrylic component and based on the dry weight of the resin system. As used herein, the term "acrylic monomer mixture" refers to the monomer mixture used to prepare the acrylic component.

The acrylic component preferably includes one or more non-functional monomers and one or more functional monomers (more preferably acid-functional monomers, and even more preferably acid-functional acrylic monomers). In presently preferred embodiments, the acrylic component includes one or more vinyl monomers. The acrylic component is preferably prepared through chain-growth polymerization using one or more ethylenically unsaturated monomers. Examples of suitable ethylenically unsaturated monomers include non-functional monomers such as styrene, halostyrenes, α-methylstyrene, alkyl esters of acrylic acid (e.g., methyl acrylate, ethyl acrylate, butyl acrylate, etc.), alkyl esters of methacrylic acid and/or crotonic acid (e.g., methyl, ethyl, propyl, butyl, pentyl, hexyl, octyl, decyl, dodecyl methacrylates and crotonates), vinyl cyclohexane, vinyl cyclooctane, vinyl cyclohexene, hexanediol diacrylate, dimethyl maleate, dibutyl fumarate and similar diesters, vinyl naphthalene, vinyl toluene, vinyl acetate, vinyl propionate, vinyl cyclooctane, ally methacrylate, 2-ethylhexyl acrylate, and diesters of maleic anhydride; and functional monomers such as acid-functional monomers (e.g., acrylic acid, methacrylic acid, crotonic acid, itaconic acid, maleic anhydride and esters thereof, mesaconic acid, citraconic acid, fumaric acid, and sorbic acid), amide-functional monomers (e.g., acrylamide, methacrylamide, etc.), hydroxy-functional monomers (e.g., hydroxyalkyl acrylate or methacrylate monomers such as hydroxyethyl acrylate (HEA), hydroxyethyl methacrylate (HEMA), hydroxypropyl acrylate (HPA), hydroxypropyl methacrylate (HPMA), etc.); and variations and combinations thereof. Preferred non-functional monomers include styrene, ethyl acrylate, butyl methacrylate, and combinations thereof. Preferred functional monomers include acrylic acid, methacrylic acid, and combinations thereof.

The combination and/or ratio(s) of the above monomers may be adjusted to provide a desired coating or film property. Preferably, at least a portion of the above monomers are capable of rendering the resin system dispersible in an aqueous carrier. Examples of monomers capable of rendering the resin system dispersible in an aqueous carrier include acid-functional monomers that form salt groups upon neutralization with a base.

While not intending to be bound by theory, it is believed that, for certain embodiments of the present invention, the glass transition temperature (Tg) of the acrylic component is a factor that contributes to coating compositions exhibiting suitable resistance to retort processes associated with certain food and beverage products. In preferred embodiments, the acrylic component has a Tg of at least about 40° C., preferably at least about 60° C., more preferably at least about 80° C., and even more preferably at least about 90° C. Preferably, the acrylic component has a Tg of less than about 280° C., more preferably less than about 220° C., even more preferably less than about 180° C., even more preferably less than about 160° C., and optimally less than about 150° C. In some embodiments, the acrylic component has a Tg of less than about 130° C., or less than about 120° C. In certain preferred embodiments, the acrylic component has a Tg greater than about 100° C., more preferably from about 100° C. to about 120° C.

In general, the Fox equation may be employed to calculate the theoretical Tg of the acrylic component resulting from reaction of the acrylic monomer mixture. As used herein, unless otherwise specified, Tg refers to a theoretical Tg calculated using an equation such as, for example, the Fox equation. Examples of monomers that may be useful in achieving a Tg as described above include acrylonitrile (97° C.), acrylic acid (106° C.), methacrylic acid (228° C.), methyl methacrylate (105° C.), ethyl methacrylate (65° C.), isobutyl methacrylate (53° C.), allyl methacrylate (45° C.), 2 hydroxy ethyl methacrylate (55° C.), 2 hydroxy propyl methacrylate (55° C.), acrylamide (165° C.), styrene (100° C.), and mixtures thereof; wherein a Tg for a homopolymer of each monomer as recited in H. Coyard et al., Resins for Surface Coatings: Acrylics & Epoxies 40-41 (PKT Oldring, ed.), Vol. 1 (2nd ed. 2001) is reported in parentheses. In certain embodiments, the use of styrene, methacrylic acid, and/or acrylic acid is preferred to achieve a suitable Tg.

The amount of non-functional monomer and/or acid-functional monomer within the acrylic component may be varied to achieve a desired coating or film property.

In preferred embodiments, the acrylic component includes at least about 5 wt-%, preferably at least about 20 wt-%, and more preferably at least about 35 wt-% of non-functional monomer, based on the total weight of the acrylic monomer mixture. In preferred embodiments, the acrylic component includes less than about 95 wt-%, preferably less than about 80 wt-%, and even more preferably less than about 65 wt-% of non-functional monomer, based on the total weight of the acrylic monomer mixture. In a particularly preferred embodiment, the acrylic component includes about 45 wt-% of non-functional monomer, based on the total weight of the acrylic monomer mixture.

In preferred embodiments, the acrylic component includes an amount of acid-functional monomer of preferably at least about 10 wt-%, more preferably at least about 15 wt-%, and even more preferably at least about 20 wt-%, based on the total weight of the acrylic monomer mixture. In some embodiments, the acrylic component includes an amount of acid-functional monomer of preferably less than about 90 wt-%, more preferably less than about 85 wt-%, and even more preferably less than about 80 wt-%, based on the total weight of the acrylic monomer mixture.

The acrylic component preferably includes an amount of styrene of at least about 1 wt-%, more preferably at least about 10 wt-%, and even more preferably at least about 20 wt-%, based on the total weight of the acrylic monomer mixture. In preferred embodiments, the acrylic component includes an amount of styrene of preferably less than about 95 wt-%, more preferably less than about 70 wt-%, and even more preferably less than about 60 wt-%, based on the total weight of the acrylic monomer mixture. Some or all of the styrene may be replaced by one or more other suitable aromatic vinyl compounds. Thus, for example, some or all of the above styrene monomer concentrations may be replaced with vinyl toluene. While not intending to be bound by any theory, in certain embodiments, the presence of a suitable amount of aromatic vinyl monomers is believed to impart enhanced coating properties, especially on beverage can ends.

The acrylic component preferably includes an amount of methacrylic acid of at least about 5 wt-%, more preferably at least about 20 wt-%, and even more preferably at least about 40 wt-%, based on the total weight of the acrylic monomer mixture. In preferred embodiments, the acrylic component includes an amount of methacrylic acid of preferably less than about 95 wt-%, more preferably less than about 80 wt-%, and even more preferably less than about 65 wt-%, based on the total nonvolatile weight of the acrylic monomer mixture.

In a particularly preferred embodiment, the acrylic monomer mixture includes (i) styrene and (ii) methacrylic acid and/or acrylic acid.

As discussed above, some embodiments of the resin system may include one or more linking groups formed from one or more linking compounds. The linking group preferably links an epoxy component of the resin system to an acrylic component of the resin system. The linking group may be formed from a single compound or may be formed from a plurality of compounds. In preferred embodiments, a linking compound used to form the linking group preferably has two or more functional groups. In a preferred embodiment, the linking compound is a polyfunctional monomer with one functional group (e.g., carboxylic groups, amine groups, amide groups, etc.) capable of reacting with an epoxy group and a second functional group (e.g., a carbon-carbon double or triple bond) capable of reacting with an acrylic component.

The linking compound may contain any suitable functional group capable of reacting with an acrylic component to form a covalent linkage. In some embodiments, the linking compound has a functional group including an activated unsaturated carbon-carbon bond. As used herein, the term "activated unsaturated carbon-carbon bond" refers to a carbon-carbon triple bond or to conjugated carbon-carbon double bonds. In some embodiments, the linking compound includes one or more hydrogen capable of being extracted such as, for example, an allylic hydrogen (i.e., a hydrogen attached to a carbon atom that is adjacent to a double bond) or a double allylic hydrogen (i.e., a hydrogen attached to a carbon atom that is adjacent to two double bonds). The acrylic component may be reacted with the linking compound using any suitable reaction, including, for example, (i) hydrogen extraction to form a covalent linkage and/or (ii) direct addition to a carbon-carbon double or triple bond of the linking compound.

During preparation of the resin system, at least some of the epoxy groups provided by the epoxy compound are consumed in a reaction with the linking compound. In some embodiments, a reaction between the epoxy compound and the linking compound does not consume all the epoxy groups such that a sufficient quantity of epoxy groups remain so that a polymer of the resin system contains at least one epoxy group.

In some embodiments, an unsaturated epoxy compound (preferably containing at least one aliphatic carbon-carbon double bond) may be used. In such embodiments, at least some of the acrylic component is preferably grafted to the epoxy component (e.g., using BPO) through the unsaturation of the epoxy compound. In some embodiments, the linking compound may be included as a reactant in a reaction mixture used to form an unsaturated epoxy compound. It is also contemplated that the unsaturation may be provided using materials other than the linking compounds described above.

When included in the resin system, the linking compound is present preferably in an amount of at least about 0.003 wt-%, more preferably at least about 0.05 wt-%, and even more preferably at least about 0.1 wt-%, based on the dry weight of the resin system. In certain preferred embodiments, the linking compound is preferably present in an amount of less than about 4 wt-%, more preferably less than about 2.5 wt-%, and even more preferably less than about 1.5 wt-%, based on the dry weight of the resin system.

When included in the resin system, the linking compound is preferably present in an amount sufficient to react with at least about 0.1 wt-%, more preferably at least about 5 wt-%, and even more preferably at least about 10 wt-% of the epoxy groups provided by the epoxy compound of the epoxy component. In preferred embodiments, the linking compound is preferably present in an amount sufficient to react with less than about 50 wt-%, more preferably less than about 40 wt-%, and even more preferably less than about 25 wt-% of the epoxy groups provided by the epoxy compound of the epoxy component.

Examples of some suitable linking compounds include linking compounds having one of the below generalized structures:

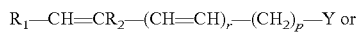

$R_1$—CH=$CR_2$—(CH=CH)$_r$—(CH$_2$)$_p$—Y or

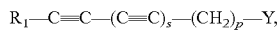

$R_1$—C≡C—(C≡C)$_s$—(CH$_2$)$_p$—Y, where $R_1$ and $R_2$ are independently a hydrogen atom, a substituted or unsubstituted alkyl group, a substituted or unsubstituted cycloalkyl group, a substituted or unsubstituted aryl group, a substituted or unsubstituted alkenyl group, or a substituted or unsubstituted aromatic group; r is a numeral from 0 to 6, preferably at least 1; s is a numeral from 0 to 6, preferably at least 1; p is a numeral from 0 to 18, preferably at least 1; and Y is an organic group capable of reacting with an epoxy group. Preferably, the linking compound has a maximum of 12 carbon atoms. In preferred embodiments, $R_2$ is a hydrogen or methyl group.

In particular, $R_1$ can be an aromatic hydrocarbyl group (e.g., a phenyl group) or a substituted aromatic hydrocarbyl group (e.g., a C1-C10 alkoxy-substituted phenyl, a halo-substituted phenyl, or a C1-C18 alkyl-substituted phenyl). The term "halo" includes fluoro, chloro, bromo, and iodo. The $R_1$ group also can be an aliphatic hydrocarbyl group or an aliphatic cyclohydrocarbyl group, either substituted or unsubstituted. Nonlimiting examples of $R_1$ include hydrogen; a C1-C18 substituted or unsubstituted alkyl group, and preferably a C1-C10 alkyl group; a C5-C7 cycloalkyl group; a phenyl-substituted C1-C18 alkyl or C5-C7 cycloalkyl group; and a halo-substituted alkyl or cycloalkyl group. The $R_1$ group also can be an unsaturated C1-C18 aliphatic hydrocarbyl group or an unsaturated C5-C7 cycloaliphatic hydrocarbyl group (i.e., the group contains one or more carbon-carbon double bonds or carbon-carbon triple bonds). Such unsaturated aliphatic hydrocarbyl and cyclohydrocarbyl groups can be substituted or unsubstituted. Any substituent groups on $R_1$ are preferably sufficiently nonreactive such that the substituents do not interfere in the preparation of the resin system. In particularly preferred embodiments, $R_1$ is hydrogen, a C1-C4 alkyl group, a C5-C7 cycloalkyl group, or a phenyl group.

The Y group may be any suitable group capable of reacting with an epoxy group. Examples of such groups include carboxyl, amido (—CON($R_2$)$_2$), amino (—N($R_2$)$_2$), hydroxyl, or mercapto (—SR$_3$); wherein $R_2$ groups are, independently, hydrogen, or C1-C4 alkyl or phenyl groups; and $R_3$ is hydrogen or C1-C4 alkyl or phenyl groups.

Specific examples of suitable linking compounds include sorbic acid, sorbic alcohol, maleic anhydride and esters thereof, dicyclopentadiene acids, conjugated unsaturated fatty acids (e.g., eleostearic acid), 3-pentyn-1-ol, 2-pentyn-1-ol, 4-pentynoicacid, 4-pentyn-1-ol, 4-pentyn-2-ol, 1-pentyn-3-ol, heptacose-10,12-diynoicacid, heptadeca-2,4-diynoic acid, heneicosa-2,4-diynoic acid, 2-heptynoic acid, 2-hexynoic acid, nonacosa-10,12-diynoic acid, nonadeca-1,4-diynoic acid, 2-nonynoic acid, pentadeca-2,4-diynoic acid, pentacosa-10,12-diynoic acid, phenylpropiolic acid, propiolic acid, tetrolic acid, tricosa-10,12-diynoic acid, 10-undecynoic acid, 1-butyn-3-ol, 2-butyn-1-ol, 3-butyn-1-ol, 2-decyn-1-ol, 3-decyn-1-ol, 3,6-dimethyl-1-heptyn-3-ol, 3,5-dimethyl-1-hexyn-3-ol, 3,4-dimethyl-1-pentyn-3-ol, 3-ethyl-1-heptyn-3-ol, 4-ethyl-1-hexyn-3-ol, 3-ethyl-5-methyl-1-heptyn-3-ol, 4-ethyl-1-octyn-3-ol, 3-ethyl-1-pentyn-3-o-1,1-ethynyl-1-cyclohexanol, 1-heptyn-3-ol, 2-heptyn-1-ol, 3-heptyn-1-ol, 4-heptyn-2-ol, 5-heptyn-3-ol, 1-hexyn-3-ol, 2-hexyn-1-ol, 3-hexyn-1-ol, 4-hexyn-2-ol, 5-hexyn-1-ol, 5-hexyn-3-ol, 3-methyl-1-butyn-3-ol, 5-methyl-1-hexyn-3-ol, 3-methyl-1-pentyn-3-ol, 3-nonyn-1-ol, 1-octyn-3-ol, 3-octyn-1-ol, 1-phenyl-2-propyn-1-ol, 2-propyn-1-ol, 10-undecyn-1-ol, 3-amino-phenylacetylene, propargylamine, and mixtures thereof. A particularly preferred linking compound is sorbic acid (also known as 2,4-hexadienoic acid). In some embodiments, linking compounds such as acrylic acid, methacrylic acid, crotonic acid, acrylamide, methacrylamide, and combinations thereof, may be used alone or in combination with any of the above linking compounds.

A free-radical initiator is preferably used in preparation of the coating composition of the present invention. Suitable free-radical initiators include, for example, peroxides such as benzoyl peroxide, t-butyl peroxide, t-butyl hydroperoxide, t-amyl peroxide, t-amyl hydroperoxide, t-butyl peroxybenzoate, t-butyl peroxy-2 ethyl hexanoate, t-amyl peroxy-2 ethyl hexanoate and 1,1-di(tertioamylperoxy)cyclohexane; azoic-based initiators such as azobisisobutyronitrile and azobismethylbutyronitrile; persulfates such as ammonium persulfate, potassium pursulfate, and other alkali metal persulfates; sulfites; bisulfites; azoalkanes; UV or visible light initiators; and combinations thereof. Other free-radical initiators may additionally or alternatively be used. Alkali metal persulfates may be combined with a suitable reducing agent such as hydrazine, ammonium or alkali metal sulfites, bisulfites, metabisulfites or hydrosulfites. Preferably, the free-radical initiator is organosoluble.

Benzoyl peroxide (BPO) is a preferred free-radical initiator. While not intending to be bound by theory, the inclusion of one or more free-radical initiators such as BPO is thought to contribute to grafting of acrylic components and epoxy components through a proton extraction, which may enhance retort resistance and compatibilization of the resin system. Some examples of other free-radical initiators that may result in suitable grafting include di tert butyl peroxide, cumene hydroperoxide, and combinations thereof.

When used, the free-radical initiator is preferably present in an amount sufficient to polymerize one or more polymers of the resin system. The amount of initiator used is preferably at least about 0.5 wt-% and more preferably at least about 1 wt-%, based on the total dry weight of the acrylic monomer mixture. The amount of initiator used is preferably less than about 10 wt-%, more preferably less than about 7.5 wt-%, and most preferably less than about 5 wt-%, based on the total dry weight of the acrylic monomer mixture.

As discussed above, in some embodiments, coating compositions of the present invention may be formulated using one or more curing agents, including, for example, one or more crosslinkers. The choice of a particular crosslinker typically depends on the particular product being formulated. For example, some coating compositions are highly colored (e.g., gold-colored coatings). These coatings may typically be formulated using crosslinkers that themselves tend to have a yellowish color. In contrast, white coatings are generally formulated using non-yellowing crosslinkers, or only a small amount of a yellowing crosslinker.

Any suitable crosslinker (or combination of crosslinkers) can be used. For example, phenolic crosslinkers (e.g., phenoplasts), amino crosslinkers (e.g., aminoplasts), and combinations thereof, may be used. The crosslinker may be water-soluble, water-dispersible, organo-dispersible, and/or organosoluble (i.e., readily soluble in an organic solvent).

The concentration of crosslinker may vary depending upon the desired coating or film property and/or the particular crosslinker (or crosslinkers) used. In some embodiments, the coating composition preferably contains between about 0.01 wt-% and about 30 wt-%, more preferably between 0.25 wt-% and about 10 wt-%, and even more preferably between about 0.5 wt-% and about 5 wt-% of crosslinker, by weight of nonvolatile material in the coating composition. To achieve a cured coating having a suitable amount of flexibility for certain beverage can end applications, coating compositions of the present invention intended for such applications preferably contain less than about 5 wt-% of crosslinker, by weight of nonvolatile material in the coating composition.

Examples of suitable phenolic crosslinkers (e.g., phenoplasts) include the reaction products of aldehydes with phenols. Formaldehyde and acetaldehyde are preferred aldehydes. Examples of suitable phenols that can be employed include phenol, cresol, p-phenylphenol, p-tert-butylphenol, p-tert-amylphenol, cyclopentylphenol, cresylic acid, BPA, and combinations thereof. Examples of suitable commercially-available phenolic compounds include BAKELITE 6535 LB, 6581 LB, and 6812 LB (each available from Hexion Specialty Chemicals GmbH), DUREZ 33162 (Durez Corporation, Addison, Tex.), PHENODUR PR 285 55/IB/B and PR 897 (each available from CYTEC Surface Specialties, Smyrna, Ga.), and SANTOLINK EP. In some embodiments, the phenolic crosslinker has a weight average molecular weight ($M_w$) of between about 500 and about 8,000. In some embodiments, the phenolic crosslinker has a $M_w$ of between about 1,200 and about 5,000.

Amino crosslinker resins (e.g., aminoplasts) are typically the condensation products of aldehydes (e.g., such as formaldehyde, acetaldehyde, crotonaldehyde, and benzaldehyde) with amino- or amido-group-containing substances (e.g., urea, melamine and benzoguanamine). Suitable amino crosslinking resins include, for example, benzoguanamine-formaldehyde-based resins, melamine-formaldehyde-based resins (e.g., hexamethonymethyl melamine), etherified melamine-formaldehyde, and urea-formaldehyde-based resins. In a preferred embodiment, the amino crosslinker is a benzoguanamine-based resin.

Condensation products of other amines and amides can also be employed such as, for example, aldehyde condensates of triazines, diazines, triazoles, guanadines, guanamines and alkyl- and aryl-substituted melamines. Some examples of such compounds are N,N'-dimethyl urea, benzourea, dicyandimide, formaguanamine, acetoguanamine, glycoluril, ammelin 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, 3,4,6-tris(ethylamino)-1,3,5-triazine, and the like. While the aldehyde employed is typically formaldehyde, other similar condensation products can be made from other aldehydes, such as acetaldehyde, crotonaldehyde, acrolein, benzaldehyde, furfural, glyoxal and the like.

Suitable commercially available amino crosslinking resins include, for example, CYMEL 301, CYMEL 303, CYMEL 370, CYMEL 373, CYMEL 1131, CYMEL 1125, and CYMEL 5010 (all commercially available from Cytec Industries Inc., West Patterson, N.J.).

In some embodiments, one or more catalysts (preferably organometallic catalysts) are included in the coating compositions of the present invention. While not intending to be bound by theory, the presence of a suitable amount of one or more suitable catalysts may, for example, enhance crosslinking and/or adhesion of the coating compositions to substrates, which may be desirable for certain applications. Non-limiting examples of suitable catalysts that may be used in the coating compositions include an aluminum-containing catalyst (e.g., an aluminum chelate such as aluminum acetylacetonate), a titanium-containing catalyst (e.g., a titanium chelate), or a combination thereof.

In some embodiments, one or more catalysts are included in the coating composition in an amount of more than about 0 wt-%, more preferably at least about 0.01 wt-%, and even more preferably at least about 0.05 wt-%, by weight of active material of the one or more catalysts in the coating composition. In a preferred embodiment, one or more catalysts are included in an amount of less than about 15 wt-%, more preferably less than about 10 wt-%, and even more preferably less than about 5 wt-%, by weight of active material of the one or more catalysts in the coating composition.

In some embodiments, the titanium-containing catalyst is selected from the group consisting of titanium acetylacetonate, tetraalkyltitanates, isopropylorthotitanate, water-soluble titanium chelated salts, triethanolamine chelates of titanium, tetratriethanolamine chelates of titanium, lactic acid titanium chelates, and combinations thereof. Suitable commercially available titanium-containing catalysts may include, for example, Tyzor 131, LA, TE, and TPT (all commercially available from Du Pont de Nemours, Wilmington, Del.) and VERTEC IA10, PI2, TAA, TET, and XL900 (all commercially available from Johnson Matthey, Chicago, Ill.).

In some embodiments, one or more zirconium-containing catalysts may be included in coating compositions. The one or more zirconium-containing catalysts may be used alone or in combination with one or more non-zirconium-containing catalysts. Examples of zirconium-containing catalysts include zirconium propionate, zirconium acetate, ammonium zirconyl carbonate, zirconate (2)-bis[carbonato(2)-O]dihydroxy-diammonium, zirconium chelated salts, sodium zirconium lactate, sodium zirconium glycolate, tetrakis [[2,2',2"-nitrilotris(ethanolato)](1-)—N,O]zirconium, and combinations thereof. Examples of commercially available zirconium-containing catalysts include, for example, BACOTE 20 (MEL Chemicals, Manchester, UK), and Tyzor 217, 218, and TEAZ (all commercially available from Du Pont de Nemours, Wilmington, Del.).

In some embodiments, a coating composition having one or more desired coating properties (e.g., a cured coating formed therefrom is capable of withstanding retort in 1 wt-% citric acid) can be achieved through incorporation of a suitable amount of one or more catalysts (e.g., titanium-containing catalyst) without the use of any crosslinker.

Coating compositions of the invention may also include other optional polymers that do not adversely affect the coating compositions or cured coatings resulting therefrom. Such optional polymers are typically included in a coating composition as a filler material, although they can be included as a crosslinking material, or to provide desirable properties. One or more optional polymers (e.g., filler polymers) can be included in a sufficient amount to serve an intended purpose, but not in such an amount to adversely affect a coating composition or a cured coating resulting therefrom.

A coating composition of the invention may also include other optional ingredients that do not adversely affect the coating composition or a cured coating resulting therefrom. Such optional ingredients are typically included in a coating composition to enhance composition aesthetics, to facilitate manufacturing, processing, handling, and application of the composition, and to further improve a particular functional property of the coating composition or a cured coating resulting therefrom. Such optional ingredients include, for example, dyes, pigments, toners, extenders, fillers, lubricants, anticorrosion agents, flow control agents, thixotropic agents, dispersing agents, antioxidants, adhesion promoters, light stabilizers, organic solvents, surfactants, and mixtures thereof. Each optional ingredient is included in a sufficient amount to serve its intended purpose, but not in such an amount to adversely affect a coating composition or a cured coating composition resulting therefrom.

One useful optional ingredient is a lubricant (e.g., a wax), which may facilitate manufacture of metal articles by, for example, imparting lubricity to coated metal substrate. Carnauba wax is an example of a preferred lubricant. If used, a lubricant is preferably present in the coating composition in an amount of at least about 0.1 wt-%, and preferably less than about 2 wt-%, and more preferably less than about 1 wt-%, by the weight of nonvolatile material in the coating composition.

Another useful optional ingredient is a pigment such as, for example, titanium dioxide.

Surfactants can be optionally added to the coating composition to aid in flow and wetting of the substrate. Examples of surfactants, include, but are not limited to, nonylphenol polyethers and salts and similar surfactants.

The resin system of the present invention is preferably capable of being dispersed in an aqueous carrier (e.g., water). Coating compositions of the present invention preferably include between about 10 wt-% and about 80 wt-%, more preferably between about 15 wt-% and about 65 wt-%, and even more preferably between about 20 wt-% and about 50 wt-% of aqueous carrier, based on the weight of the coating composition.

Coating compositions of the present invention preferably include between about 5 wt-% and about 55 wt-%, more preferably between about 15 wt-% and about 55 wt-%, and even more preferably between about 30 wt-% and about 50 wt-% of nonvolatile components, based on the weight of the coating composition. Other optional components, such as a pigment, a filler, or an additive to enhance composition aesthetics or performance, also can be included in the composition, and can accordingly increase the weight percent of total nonvolatile material in the composition to above about 60% by weight of the coating composition.

The coating composition can also include a volatile organic solvent to, for example, assist in dispersing or emulsifying composition ingredients or to improve application of the coating composition to a substrate. In some embodiments, the coating composition includes preferably between about 5 wt-% and about 50 wt-%, more preferably between about 12 wt-% and about 50 wt-%, and even more preferably between about 20 wt-% and about 40 wt-% of volatile organic solvent, based on the weight of the coating composition.

Suitable volatile organic solvents preferably have a sufficiently low vapor pressure to resist evaporation during storage and a sufficiently high vapor pressure to be evaporated from the coating composition during cure. Non-limiting examples of suitable volatile organic solvents include the methyl, ethyl, propyl, butyl, hexyl or phenyl ether of ethylene glycol; monoethylene glycol; diethylene glycol; triethylene glycol; propylene glycol or dipropylene glycol; ethylene glycol methyl ether acetate; ethylene glycol ethyl ether acetate; ethylene glycol butyl ether acetate; diethylene glycol monoethyl ether; diethylene glycol ethyl ether acetate; diethylene glycol butyl ether acetate; propylene glycol methyl ether acetate; dipropylene glycol methyl ether acetate; n-butanol; hexyl alcohol; hexyl acetate; methyl n-amyl ketone; butylene glycol; diisobutyl ketone; methyl propyl ketone; methyl ethyl ketone; methyl isobutyl ketone; 2-ethoxyethyl acetate; t-butyl alcohol; amyl alcohol; 2-ethylhexyl alcohol; cyclohexanol; isopropyl alcohol; and similar organic solvents, and mixtures thereof. Specific preferred volatile organic solvents include ethylene glycol, propylene glycol, and mixtures thereof.

A specific preferred coating composition of the present invention includes an amount of nonvolatile components of between about 30 and about 50 wt-%, an amount of volatile organic solvent of between about 20 and about 40 wt-%, and an amount of aqueous carrier of between about 20 and about 50 wt-%, based on the total weight of the coating composition.

The coating composition of the present invention may vary depending upon the particular coating or film properties desired for a particular application. For example, in some applications, such as internal coatings for beverage can ends, the cured coating should preferably possess a suitable amount of flexibility to withstand the mechanical stresses associated with formation of the beverage can end through deformation (e.g., stamping or molding) of the coated substrate. In applications that involve less mechanical stress being placed on the cured coating, flexibility may not be as important as, for example, beverage can end applications. Likewise, the coating composition of the present invention may also vary depending upon the nature of the food or beverage products that may contact the coating.

The coating composition of the present invention may be formed using any suitable technique and equipment.

For example, a suitable coating composition can be prepared using the following non-limiting example of a method of the present invention. The resin system is prepared by (a) reacting a linking compound with an advanced epoxy compound or by (b) advancing a low molecular weight epoxy compound to a desired EEW while simultaneously reacting the advancing epoxy resin with the linking compound. These reactions are typically conducted in organic solvent. An acrylic monomer mixture for forming the acrylic component is then polymerized, in the presence of the epoxy compound bonded to the linking compound, to form the acrylic component. The acrylic monomer mixture is preferably polymerized in the presence of a free-radical initiator described herein and may be fed into the reaction mixture over time (e.g., 90 minutes). To render the resulting resin system water-dispersible, a suitable amount of neutralizing agent is added to the reaction mixture to form salt groups on the resin system. Optional crosslinker is then added to the reaction mixture, followed by the addition of an amount of aqueous carrier sufficient to disperse the resin system in the aqueous carrier. Optional catalyst is then added to the resulting coating composition. Catalyst, wax, and other optional ingredients may be added to the coating composition in one or more addition steps. Additional aqueous carrier and/or organic solvent may be added to achieve a coating composition having a desired coating or film property (e.g., viscosity, solid content, etc.).

Crosslinker may optionally be added before, after, or both before and after the above dispersion step. In some embodiments, the crosslinker may be added in two or more additional steps that may include agitation and may be separated by optional delay time periods. In a preferred embodiment, a crosslinker in organic solvent is added after addition of the neutralizing agent and before dispersion of the resin system in the aqueous carrier. While not intending to be bound by theory, the addition of crosslinker at this time is believed to result in an amount of crosslinking between the epoxy and acrylic components that may enhance the retort resistance of cure coatings resulting therefrom.

Examples of suitable neutralizing agents for rendering the resin system water-dispersible include neutralizing bases such as a primary, secondary or tertiary amine; a primary, secondary or tertiary alkanolamine; ammonium; an alkylammonium hydroxide; an arylammonium hydroxide; or mixtures thereof. Examples of suitable neutralizing bases include ammonium hydroxide, a tetraalkylammonium hydroxide (wherein an alkyl group has preferably one to about 4 carbon atoms e.g., tetramethylammonium hydroxide), monoethanolamine, dimethylamine, methyldiethanolamine, benzylamine, diisopropylamine, methylethanolamine, butylamine, piperazine, dimethylethanolamine, diethylethanolamine, diethanolamine, morpholine, N-methylmorpholine, N-ethylmorpholine, triethylamine, 2-dimethylamine-2-methyl-1-propanol, diisopropanolamine, trimethylamine, N-methylpiperidine, 2-amino-2-methyl-1-propanol, piperidine, pyridine, dimethylaniline, and similar amines and alkanolamines, and mixtures thereof.

The present invention also provides a method of coating a substrate. In some embodiments, the metal substrate is a metal typically used in the food and beverage packaging industry, such as, for example, steel, aluminum, or a combination thereof. In one embodiment, the method includes forming a composition described herein and applying the composition to a metal substrate prior to, or after, forming the metal substrate into a food or beverage container or a portion thereof (e.g., beverage can ends).

Any suitable method and equipment may be used to apply the coating composition to a substrate. Examples of suitable application methods include roll coating, spray coating, dipping, and wash coating.

After application of the coating composition to a substrate, the coating is preferably hardened (or cured) by exposing the coated substrate to a suitable amount of heat for a suitable period of time. In some preferred embodiments, the coating composition is cured at a peak metal temperature of between about 175-280° C. for between about 5 seconds and about 15 minutes. An article disclosed herein may then be formed from the resulting coated substrate.

As described above, preferred coating compositions of the invention are particularly well adapted for use on food and beverage cans (e.g., two-piece cans, three-piece cans, etc.). Preferred coatings are suitable for use in food or beverage contact situations and may be used on the inside (or outside) of such cans. Certain embodiments are particularly suitable for spray application and/or coil coating application. The present invention also offers utility in other applications. These additional applications include, but are not limited to, wash coating, sheet coating, and side seam coatings (e.g., food can side seam coatings).

Spray coating may include the introduction of the coated composition into the inside of a preformed packaging container. Typical preformed packaging containers suitable for spray coating include food cans, beer and beverage containers, and the like. The spray preferably utilizes a spray nozzle capable of uniformly coating the inside of the preformed packaging container. The sprayed preformed container is then preferably subjected to heat to remove the residual solvents and harden the coating.

A coil coating is described as the coating of a continuous coil composed of a metal (e.g., steel or aluminum). Once coated, the coating coil is typically subjected to a short thermal, ultraviolet, and/or electromagnetic curing cycle for hardening (e.g., drying and curing) of the coating. Coil coatings provide coated metal (e.g., steel and/or aluminum) substrates that can be fabricated into formed articles, such as two-piece drawn food cans, three-piece food cans, food can ends, drawn and ironed cans, beverage can ends, and the like.

A wash coating is commercially described as the coating of the exterior of two-piece drawn and ironed ("D&I") cans with a thin layer of protectant coating. The exterior of these D&I cans are "wash-coated" by passing pre-formed two-piece D&I cans under a curtain of a coating composition. The cans are inverted, that is, the open end of the can is in the "down" position when passing through the curtain. This curtain of coating composition takes on a "waterfall-like" appearance. Once these cans pass under this curtain of coating composition, the liquid coating material effectively coats the exterior of each can. Excess coating is typically removed through the use of an "air knife." Once the desired amount of coating is applied to the exterior of each can, each can is preferably passed through a thermal, ultraviolet, and/or electromagnetic curing oven to harden (e.g., dry and cure) the coating.

A sheet coating is described as the coating of separate pieces of a variety of materials (e.g., steel or aluminum) that have been pre-cut into square or rectangular "sheets." Typical dimensions of these sheets are approximately one square meter. Once coated, each sheet is cured. Once hardened (e.g., dried and cured), the sheets of the coated substrate are collected and prepared for subsequent fabrication. Sheet coatings provide coated metal (e.g., steel or aluminum) substrate that can be successfully fabricated into formed articles, such as two-piece drawn food cans, three-piece food cans, food can ends, drawn and ironed cans, beverage can ends, and the like.

In one embodiment, a side seam coating may be described as the spray application of a liquid coating over the welded area of formed three-piece food cans. When three-piece food cans are being prepared, a rectangular piece of coated substrate is formed into a cylinder. The formation of the cylinder is rendered permanent due to the welding of each side of the rectangle via thermal welding. Once welded, each can typically requires a layer of liquid coating, which protects the exposed "weld" from subsequent corrosion or other effects to the contained foodstuff. The liquid coatings that function in this role are termed "side seam stripes." Typical side seam stripes are spray applied and cured quickly via residual heat from the welding operation in addition to a small thermal, ultraviolet, and/or electromagnetic oven.

Other commercial coating application and curing methods are also envisioned, such as, for example, electrocoating, extrusion coating, laminating, powder coating, and the like.

Test Methods

Unless indicated otherwise, the following test methods were utilized in the Examples that follow.

A. Adhesion

Adhesion testing was performed to assess whether the coating adheres to the coated substrate. The Adhesion Test was performed according to ASTM D 3359 Test Method B, using tape under the tradename SCOTCH® 610 tape, available from 3M Company of Saint Paul, Minn. Adhesion is generally rated on a scale of 0-10 where a rating of "10"

indicates no adhesion failure, a rating of "9" indicates 90% of the coating remains adhered, a rating of "8" indicates 80% of the coating remains adhered, and so on.

Adhesion ratings of 10 are typically desired for commercially viable coatings. Preferred coatings of the present invention after retort pursuant to the Retort Method exhibit an adhesion rating of preferably at least 8, more preferably at least 9, and most preferably 10, when tested as described above. A coating is considered herein to satisfy the Adhesion Test if it exhibits an adhesion rating of at least 8.

The results of this test for coatings prepared according to the present invention (after retort pursuant to the Retort Method) are presented in Table 2.

B. Blush Resistance

Blush resistance measures the ability of a coating to resist attack by various solutions. Typically, blush is measured by the amount of water absorbed into a coated film. When the film absorbs water, it generally becomes cloudy or looks white. Blush is generally measured visually using a scale of 0-10 where a rating of "10" indicates no blush and a rating of "0" indicates complete whitening of the film. Samples of coated substrate were rated for blush as follows:

10: no observed blushing to the coating
8-9: a very slight haze observed on the surface of the coating
7: a slightly cloudy appearance to the coating observed
5-6: a moderate cloudy appearance to the coating observed
3-4: a cloudy appearance to the coating observed
1-2: near-complete whitening of the coating observed
0: complete whitening of the coating observed Blush ratings of at least 7 are typically desired for commercially viable coatings and optimally 9 or above.

A coating is considered herein to satisfy the Blush Resistance Test if it exhibits a blush rating of at least 7 when tested as described above. Preferred coatings of the present invention after retort pursuant to the Retort Method exhibit a blush rating of preferably at least 7, more preferably at least 8, even more preferably at least 9, and most preferably 10, when tested as described above.

The results of this test for coatings prepared according to the present invention (after retort pursuant to the Retort Method) are presented in Table 2.

C. Stain Resistance

Stain resistance is generally measured visually using a scale of 0-10, where a rating of "10" indicates no staining and a rating of "0" indicates a complete change of the color of the film. Samples of coated substrate were rated for stain resistance as follows:

10: no discoloration of the coating observed
8-9: very slight discoloration of the coating observed
7: some discoloration of the coating observed
6: appreciable discoloration of the coating observed
2-5: strong discoloration of the coating observed
0-1: very strong discoloration of the coating observed Stain resistance ratings of at least 6 are typically desired for commercially viable coatings and optimally 8 or above. A coating is considered herein to satisfy the Stain Resistance Test if it exhibits a stain rating of at least 6 when tested as described above.

Preferred coatings of the present invention after retort pursuant to the Retort Method exhibit a stain resistance rating of preferably at least 7, more preferably at least 8, even more preferably at least 9, and most preferably 10, when tested as described above.

The results of this test for coatings prepared according to the present invention (after retort pursuant to the Retort Method) are presented in Table 2.

D. Porosity Test

This test provides an indication of the level of flexibility of a coating. Moreover, this tests measures the ability of a coating to retain its integrity as it undergoes the formation process necessary to produce a beverage can end. It is a measure of the presence or absence of cracks or fractures in the formed end. The end is typically placed on a cup filled with an electrolyte solution. The cup is inverted to expose the surface of the end to the electrolyte solution. The amount of electrical current that passes through the end is then measured. If the coating remains intact (no cracks or fractures) after fabrication, minimal current will pass through the end.

For the present evaluation, fully converted 206 standard opening beverage can ends were exposed for a period of 4 seconds to an electrolyte solution comprised of 1% NaCl by weight in deionized (DI) water. Metal exposure was measured using a WACO Enamel Rater II, available from the Wilkens-Anderson Company, Chicago, Ill., with an output voltage of 6.3 volts. The measured electrical current, in milliamps, is reported. End continuities are typically tested initially and then after the ends are subjected to pasteurization or retort.

A coating is considered herein to satisfy the Porosity Test if it passes an electric current (after end formation) of less than about 10 milliamps (mA) when tested as described above.

Preferred coatings of the present invention before retort or pasteurization pass less than about 10 mA when tested as described above, more preferably less than about 5 mA, even more preferably less than about 2 mA, and optimally less than about 1 mA. After pasteurization or retort, preferred coatings exhibit continuities of less than about 20 mA, more preferably less than about 10 mA, even more preferably less than about 5 mA, and even more preferably less than about 2 mA.

The results of this test for coatings prepared according to the present invention (after retort pursuant to the Retort Method) are presented in Table 2.

E. Retort Method

Coated substrate samples were placed in a vessel and partially immersed in a test substance. While partially immersed in the test substance, the coated substrate samples were placed in an autoclave and subjected to heat of 121° C. and pressure of 1 atm above atmospheric pressure for a time period of either 30 minutes (for 0.4, 1.0, and 2.0 wt-% citric acid solutions; and GATORADE beverage product), 60 minutes (for acidified coffee), or 90 minutes (for DI water), depending upon the particular test substance. The coated substrate samples were then tested for adhesion, blush resistance, stain resistance, and porosity pursuant to the Coating Property Test methods described above.

For the Porosity Test, a beverage end was fabricated from coated planar substrate and the formed beverage end was then retorted using the above methodology prior to conducting the Porosity Test.

F. Preparation of Retort Test Substances

Unless indicated otherwise, the following substances are the test substances used in the Coating Property Tests:

0.4, 1.0, and 2.0 wt-% citric acid solutions were prepared by combining suitable amounts of citric acid with suitable volumes of DI water to produce solutions including the indicated concentrations of citric acid.

An acidified coffee solution was prepared by dissolving 4 grams of citric acid per liter of coffee.

A solution of GATORADE beverage product was prepared by dissolving 60 grams of powdered GATORADE beverage product in a sufficient amount of DI water to produce 1 liter of solution.

G. Double Seaming Test

This test provides an indication of the suitability of a coating on the exterior surface of a beverage can end. A suitable lab seaming machine developed for the canning industry was used to double seam a beverage can end (202 or 206 beverage can end) on top of a beverage can body to form an air-tight double seamed can. The exterior coating composition on the beverage can end was then assessed for adhesion (to the underlying substrate), flexibility and gloss and accordingly assigned a numerical value from 1 to 10. A value of "1" indicates a complete loss of adhesion and flexibility of the external coating and a value of "10" indicates no film defects of the external coating (i.e., no loss of adhesion, flexibility or gloss).

EXAMPLES

The present invention is illustrated by the following examples. It is to be understood that the particular examples, materials, amounts, and procedures are to be interpreted broadly in accordance with the scope and spirit of the invention as set forth herein. Unless otherwise indicated, all parts and percentages are by weight and all molecular weights are weight average molecular weight. Unless otherwise specified, all chemicals used are commercially available from, for example, Sigma-Aldrich, St. Louis, Mo.

| ABBREVIATIONS, DESCRIPTIONS, AND SOURCES OF MATERIALS | |
|---|---|
| D.E.R. 331 | D.E.R. 331 Liquid Epoxy Resin Dow Chemical Co., Midland, MI. |
| BPA | Bisphenol A |
| BTPPB | Butyl triphenyl phosphonium bromide |
| EDG | Diethylene glycol monoethyl ether |
| BPO | Benzoyl peroxide |
| TRIGONOX 21 | Tertiobutyl peroxy-2 ethylhexanoate AKZO NOBEL |
| VAZO 64 (AIBN) | Azobisisobutyronitrile E. I. du Pont de Nemours and Company, Wilmington, DE |
| MICHEM LUBE 160PF-E | Wax Michelman, Inc., Cincinnati, Ohio |
| DIW | Deionized water |
| Dimer fatty acid | PRIPOL 1013 dimer fatty acid Unichema |

Examples 1-6

Preparation of Epoxy Acrylate Resin System

The compositional makeup of the epoxy acrylate resins of each of respective Examples of 1-6 is provided in Tables 1A and 1B.

For each of Examples 1-6, a reaction mixture of Components 1-5 was added to a vessel equipped with a stirrer, reflux condenser, thermocouple, heating mantle and nitrogen atmosphere. The reaction mixture was heated to 120° C. and allowed to exotherm. After exotherm, the reaction mixture was maintained at a temperature of between 178-185° C. with cooling if needed, until the Epoxy Equivalent Weight (EEW) was 3,300-3,500 g/mole.

For Example 6, component 18 was then added to the mixture and temperature adjusted at 150° C., components 20 and 19 was added and the temperature was maintained at 150° C. until the acid value was less than 1.

To the reaction mixture was added Component 17 followed by component 16 (nonvolatile content ("NVC")=57.3%) and the temperature was adjusted to 121° C.

A first premix consisting of Components 6 to 11 was prepared in a separate vessel and stirred to ensure a homogeneous mixture. This premix was then uniformly added to the reaction mixture over 90 minutes while the reaction mixture was maintained at a temperature of 119-123° C. The reaction mixture was then held for 1 hour at a temperature of 119-123° C.

Component 12 was then added to the reaction mixture and the resulting reaction mixture was stirred for an additional hour at a temperature of 119-123° C.

Then half of component 13 (by weight of the amount indicated in Tables 1A and 1B) was carefully added to the reaction mixture, while allowing the reaction temperature to decrease to between 90-91° C.

A second premix consisting of Component 14 and the remaining half of component 13 (by weight of the amount indicated in Tables 1A and 1B) was added evenly over 15 minutes to the reaction mixture, while maintaining the reaction temperature between 87-91° C. A further hold of 1 hour was performed in the same temperature range.

Component 15, which was preheated to 80-85° C., was then added evenly over 60 minutes to the reaction mixture for inversion. Heating was discontinued and the reaction mixture was cooled. The reaction mixture was then filtered through a 5-micron filter.

TABLE 1A

| Component | Material | Example 1 (Parts by weight) | Example 2 (Parts by weight) | Example 3 (Parts by weight) |
|---|---|---|---|---|
| 1 | D.E.R. 331 | 161.49 | 194.91 | 194.98 |
| 2 | BPA | 89.37 | 106.88 | 108.67 |
| 3 | Sorbic Acid | 0.93 | 1.11 | 0.56 |
| 4 | BTPPB | 0.15 | 0.18 | 0.18 |
| 5 | EDG | 5.67 | 6.82 | 6.85 |
| 18 | EDG | — | — | — |
| 19 | Tributylamine | — | — | — |
| 20 | Dimer fatty acid | — | — | — |
| 6 | Styrene | 16.93 | 25.85 | 25.97 |
| 7 | Ethyl Acrylate | — | — | — |
| 8 | Acrylic Acid | — | 11.35 | 11.40 |
| 9 | Methacrylic Acid | 52.68 | 27.13 | 27.24 |
| 10 | Butyl Methacrylate | 5.64 | 8.62 | 8.66 |
| 11 | BPO | 2.84 | 2.75 | 2.76 |
| 12 | BPO (Spikes) | — | 0.92 | 0.92 |
| 13 | Water | 38.33 | 46.13 | 46.19 |
| 14 | DMEA | 19.16 | 14.78 | 14.81 |
| 15 | Water | 420.27 | 328.13 | 325.42 |
| 16 | Butanol | 24.39 | 29.35 | 29.50 |
| 17 | EDG | 162.16 | 195.08 | 195.89 |
|  | *E/A Ratio | 76.3/23.7 | 79.8/20.2 | 80/20 |
|  | **NVM | 34.2 | 38.2 | 38.7 |
|  | ***Viscosity | 184 seconds | 42 seconds | 40 seconds |

*E/A Ratio represents the ratio of epoxy component to acrylic component for 100 total parts by weight of combined material.
**Wt-% of non-volatile material (NVM) as determined for a 0.5 gram sample heated for 30 minutes in a 177° C. oven.
***Indicates the viscosity of each coating composition at 25° C. as determined by a No. 4 Ford Cup.

TABLE 1B

| Component | Material | Example 4 (Parts by weight) | Example 5 (Parts by weight) | Example 6 |
|---|---|---|---|---|
| 1 | D.E.R. 331 | 194.88 | 192.32 | 193.49 |
| 2 | BPA | 108.43 | 107.01 | 106.82 |
| 3 | Sorbic Acid | 0.56 | 0.55 | 0.56 |
| 4 | BTPPB | 0.18 | 0.18 | 0.18 |
| 5 | EDG | 6.84 | 6.75 | 6.77 |
| 18 | EDG 2 | — | — | 68.49 |
| 19 | Tributylamine | — | — | 0.096 |

TABLE 1B-continued

| Component | Material | Example 4 (Parts by weight) | Example 5 (Parts by weight) | Example 6 |
|---|---|---|---|---|
| 20 | Dimer fatty acid | — | — | 8.75 |
| 6 | Styrene | 12.97 | 19.2 | 19.83 |
| 7 | Ethyl Acrylate | 12.97 | 6.4 | 6.6 |
| 8 | Acrylic Acid | 11.39 | 11.24 | 11.99 |
| 9 | Methacrylic Acid | 27.21 | 26.85 | 27.4 |
| 10 | Butyl Methacrylate | 8.65 | 8.54 | 8.8 |
| 11 | BPO | 2.76 | 2.72 | 2.11 |
| 12 | BPO (Spikes) | 0.92 | 0.91 | 0.703 |
| 13 | Water | 46.08 | 45.5 | 47.1 |
| 14 | DMEA | 14.79 | 14.6 | 15.18 |
| 15 | Water | 326.24 | 335.05 | 317.12 |
| 16 | Butanol | 29.47 | 29.08 | 32.6 |
| 17 | EDG | 195.66 | 193.11 | 125.38 |
|   | Total | 1000 | 1000 | 1000 |
|   | *E/A Ratio | 80/20 | 80/20 | 80/20 |
|   | **NVM | 38.5 | 37.7 | 39.0 |
|   | ***Viscosity | 53 seconds | 31 seconds | 74 seconds |

*E/A Ratio represents the ratio of epoxy component to acrylic component for 100 total parts by weight of combined material.
**Wt-% of non-volatile material (NVM) as determined for a 0.5 gram sample heated for 30 minutes in a 177° C. oven.
***Indicates the viscosity of each coating composition at 25° C. as determined by a No. 4 Ford Cup.

Examples 7-10

Preparation of Coating Compositions

The coating composition of Example 7 was prepared using 100 parts of the Example 2 resin, 2.4 parts of a 27.5 wt-% non-volatile material (NVM) solution of butylated phenolic crosslinker, 1.2 parts of a 38.2 wt-% NVM solution of n-butylated benzoguanamine crosslinker, 0.85 parts of MICHEM LUBE 160 PF-E, and 2.2 parts of a 5 wt-% NVM solution of a suitable catalyst.

The coating composition of Example 8 was prepared using 100 parts of the Example 3 resin, 2 parts of a 27.5 wt-% NVM solution of butylated phenolic crosslinker, 1.62 parts of a 33 wt-% NVM solution of n-butylated benzoguanamine crosslinker, 1.05 parts of MICHEM LUBE 160 PF-E, and 1.68 parts of a 5 wt-% NVM solution of a suitable catalyst.

The coating composition of Example 9 was prepared using 100 parts of the Example 5 resin, 2.5 parts of a 27.5 wt-% NVM solution of butylated phenolic crosslinker, 1 part of a 33 wt-% solution of n-butylated benzoguanamine crosslinker, 1 part of MICHEM LUBE 160 PF-E, and 2.05 parts of a 5 wt-% NVM solution of a suitable catalyst.

The coating composition of Example 10 was prepared using 100 parts of the Example 6 resin, 0.5 parts of MICHEM LUBE 160 PF-E, 1 part of a methylated phenolic crosslinker.

To produce the coating compositions of Examples 7-10, the crosslinkers and catalysts (if any) were first suitably diluted to produce the above solutions. The crosslinkers were each diluted in a suitable amount of butanol and the catalysts were diluted with a suitable amount of DIW. The crosslinker solutions were then slowly added into the resins of Examples 2, 3, and 5 under vigorous agitation. Once the introduction of crosslinker solution was completed, the agitation was maintained 15 minutes. After that, the catalyst solution (if any) and the wax were slowly added under agitation. The agitation was maintained for 15 minutes to disperse the ingredients.

The resulting varnishes were allowed to stand for 12 hours before being used to coat any substrate.

Examples 11-14

Coating of Substrate with Coating Compositions of Examples 7-10

To produce the coated substrate samples of Examples 11-13, the coating compositions of Examples 7-9 were applied to samples of aluminum substrate (5182-0.224 mm-H48 Cr treated spray from Rhenalu (Alcan)) using a bar coater. The coated substrate samples were then cured in an oven for 21 seconds at a peak metal temperature (PMT) of 232° C. The dry film weight of the resulting cured coatings was about 12 gram per meter-squared (g/m$^2$).

To produce the coated substrate samples of Examples 14, the coating compositions of Example 10 was applied to samples of aluminum substrate 5182H19 (Alcoa). The coated substrate samples were then cured in an oven for 14 seconds at a PMT of 232° C. The dry film weight of the resulting cured coatings was about 12 g/m$^2$.

Effect of Retort on the Coated Substrate Samples of Examples 11-14

The coated substrate samples of Examples 11-14 were then retorted pursuant to the above Retort Method in the test substances indicated below in Table 2. After retort, the coated substrate samples of Examples 11-14 were subjected to the Adhesion Test, the Blush Resistance Test, the Stain Resistance Test, and the Porosity Test. A different coated substrate sample was used for each Coating Property Test (i.e., a single coated sample was not subjected to multiple Coating Property Tests). The results of these tests are shown in Table 2. The Stain Resistance Test was only conducted on coated substrate samples retorted in GATORADE solution or acidified coffee, while the Porosity Test was only conducted on coated substrate samples retorted in 1% citric acid solution.

TABLE 2

| Example | Coating Composition | Test Substance | Adhesion Liquid* | Blush Liquid*/Vapor** | Stain Liquid* | Porosity (mA) Before Retort (Avg. of 8 Ends) | Porosity (mA) After Retort (Avg. of 4 Ends) |
|---|---|---|---|---|---|---|---|
| 11 | 7 | DIW | 10 | 10/10 | — | — | — |
|    |   | Citric Acid 1% | 10 | 9/10 | — | 0.4 | 0.8 |
|    |   | Citric Acid 2% | 10 | 9/8 | — | — | — |
|    |   | Gatorade | 10 | 10/9 | 8 | — | — |
|    |   | Acidified Coffee | 10 | 9/8 | 7 | — | — |
| 12 | 8 | DIW | 10 | 10/10 | — | — | — |
|    |   | Citric Acid 1% | 10 | 9/10 | — | 0.3 | 0.3 |
|    |   | Citric Acid 2% | 10 | 9/10 | — | — | — |
|    |   | Gatorade | 10 | 9/10 | 10 | — | — |
|    |   | Acidified Coffee | 10 | 9/9 | 8 | — | — |

TABLE 2-continued

| Example | Coating Composition | Test Substance | Adhesion Liquid* | Blush Liquid*/Vapor** | Stain Liquid* | Porosity (mA) Before Retort (Avg. of 8 Ends) | Porosity (mA) After Retort (Avg. of 4 Ends) |
|---|---|---|---|---|---|---|---|
| 13 | 9 | DIW | 10 | 10/10 | — | — | — |
| | | Citric Acid 1% | 10 | 10/10 | — | 0.4 | 0.5 |
| | | Citric Acid 2% | 9 | 10/9 | — | — | — |
| | | Gatorade | 10 | 10/9 | 9 | — | — |
| | | Acidified Coffee | 10 | 9/9 | 7 | — | — |
| 14 | 10 | DIW | 10 | 10/10 | — | — | — |
| | | Citric Acid 1% | 10 | 10/10 | — | 0.1 | 0.3 |
| | | Gatorade | 10 | 10/10 | 9 | — | — |
| | | Acidified Coffee | 10 | 10/10 | 9 | — | — |

*Test results for portions of coated substrate samples in contact with (i.e., immersed in) the test substance during retort.
**Test results for portions of coated substrate samples not in contact (i.e., not immersed in) the test substance during the retort.

The results summarized in Table 2 indicate that each of the cured coatings of Examples 11-13 satisfied every test conducted. As such, the results of Table 2 indicate that each of the cured compositions of Examples 11-13 were fully retortable since each of Examples 11-13 satisfied (a) the Adhesion Test for the 2% citric acid solution, the acidified coffee, and the Gatorade solution; and (b) the Porosity Test for the 1% citric acid solution.

As indicated by the data included in Table 2, the cured composition of Example 13 were at least generally retortable.

Examples 15-17

Exterior Can Coating Composition and Samples Coated Therewith

The coating composition of Example 16 was prepared using 100 parts of the Example 15 resin, 3.8 parts of a 27.5 wt-% NVC solution of resole-type phenolic resin crosslinker at 50 wt-% NVC, 1.6 parts of carnauba wax dispersion at 25% NVC (MICHEM LUBE 160 PF-E), 4.25 parts of a polyethylene wax dispersion at 18% NVC, and 1.57 parts of a 25 wt-% solution of a suitable catalyst.

The resin composition of Example 16 was prepared using the methods previously described in conjunction with Examples 1-6 and the ingredients of Table 3.

TABLE 3

| Component | Material | Example 4 (Parts by weight) |
|---|---|---|
| 1 | D.E.R. 331 | 51.84 |
| 2 | BPA | 28.06 |
| 3 | Sorbic Acid | 0.15 |
| 4 | BTPPB | 0.05 |
| 5 | EDG | 0.65 |
| 17 | EDG | 18.51 |
| 16 | Butanol | 2.80 |
| 6 | Styrene | 6.80 |
| 8 | Acrylic Acid | 2.99 |
| 9 | Methacrylic Acid | 7.13 |
| 10 | Butyl Methacrylate | 2.27 |
| 11 | BPO | 0.27 |
| 20 | Ethylhexanoate tert butyl peroxide | 0.27 |
| 21 | tert-Butyl peroxybenzoate (spikes) | 0.63 |
| 13 | Water | 4.41 |
| 14 | DMEA | 1.39 |
| 15 | Water | 36.16 |
| | Total | 100 |
| | *NVM | 36.3% |
| | **Viscosity | 41 sec |

*Wt-% of non-volatile material (NVM) as determined for a 0.5 gram sample heated for 30 minutes in a 177° C. oven.
**Indicates the viscosity of each coating composition at 25° C. as determined by a No. 4 Ford Cup.

To produce the coated substrate samples of Examples 17, the coating composition of Example 16 was applied to samples of aluminum substrate DIP (dry in place) chromated 0.224 mm thickness (Hydro). The coated substrate samples were then cured in an oven for 11 seconds at a PMT of 245° C. The dry film weight of the resulting cured coatings was about 5 g/m². The coated substrate samples were tested to assess the suitability of the coating composition of Example 16 for use as an exterior coating on beverage can sidewalls and ends. The data from these tests is included in Table 4.

TABLE 4

| Test Substance | Adhesion Liquid* | Blush Liquid*/Vapor** | Stain Liquid* | Double Seaming Test |
|---|---|---|---|---|
| DIW | 10 | 10/10 | — | 9 |
| Citric Acid 1% | 10 | 9/10 | — | — |
| Citric Acid 2% | 10 | 9/8 | — | — |
| Gatorade | 10 | 10/9 | 8 | — |
| Acidified Coffee | 10 | 9/8 | 7 | — |

*Test results for portions of coated substrate samples in contact with (i.e., immersed in) the test substance during retort
**Test results for portions of coated substrate samples not in contact (i.e., not immersed in) the test substance during the retort.

As illustrated by the data in Table 4, the coating composition of Example 16 exhibited suitable coating properties for use as an external lacquer on a beverage can end.

The invention has been described with reference to various specific and preferred embodiments and techniques. However, it should be understood that many variations and modifications may be made while remaining within the spirit and scope of the invention. The complete disclosure of all patents, patent documents, and publications are incorporated herein by reference as if individually incorporated.

What is claimed is:

1. A coated article comprising:
a food or beverage can end formed through deformation, including:

a metal internal surface; and
a cured coating disposed on at least a portion of the metal internal surface, the cured coating being formed from a coating composition that comprises:
a water-dispersible copolymer comprising:
an epoxy component; and
an acrylic component having a glass transition temperature ranging from 90° C. to 160° C.;
wherein the epoxy component is covalently attached to the acrylic component with a carbon-carbon bond; and
an aqueous carrier;
wherein the cured coating exhibits an adhesion rating of at least 8 pursuant to the Adhesion Test after retort in a 0.4 weight percent citric acid solution pursuant to the Retort Method.

2. The coated article of claim 1, wherein the cured coating passes an electric current of less than 5 milliamps pursuant to the Porosity Test.

3. The coated article of claim 1, wherein the cured coating exhibits an adhesion rating of at least 8 pursuant to the Adhesion Test after retort in a 2 weight percent citric acid solution pursuant to the Retort Method.

4. The coated article of claim 1, wherein the glass transition temperature of the acrylic component ranges up to 140° C.

5. The coated article of claim 1, wherein the acrylic component is prepared from a monomer mixture comprising one or more non-functional monomers and one or more acid-functional monomers.

6. The coated article of claim 5, wherein the non-functional monomer is present in an amount greater than about 25 weight percent, based on the total weight of the monomer mixture.

7. The coated article of claim 5, wherein the one or more non-functional monomers comprise styrene, and wherein the monomer mixture comprises from about 20 to about 60 weight percent of the non-functional monomers, based on the total weight of the monomer mixture.

8. The coated article of claim 5, wherein the wherein the one or more acid-functional monomers comprise acrylic acid, methacrylic acid, or a mixture thereof, and wherein the monomer mixture comprises from about 20 to about 50 weight percent of the acid-functional monomers, based on the total weight of the coating composition.

9. The coated article of claim 1, wherein the epoxy component comprises a reaction product of a polyether diepoxide, and wherein the polyether diepoxide is a reaction product of a dihydric phenol and a compound having one or more epoxy groups.

10. The coated article of claim 1, wherein the epoxy component comprises a reaction product of a dimer fatty acid.

11. The coated article of claim 1, and further comprising from 0.01 to 30 weight percent of one or more crosslinkers, based on the total weight of the coating composition.

12. The coated article of claim 11, where the one or more crosslinkers comprise a phenolic crosslinker, an amino crosslinker, or a combination thereof.

13. The coated article of claim 1, wherein the coating composition further comprises a catalyst comprising an organic component and a metallic component.

14. The coated article of claim 13, wherein the catalyst comprises a titanium-containing catalyst.

15. The coated article of claim 1, wherein the epoxy component further comprises a linking group through which the epoxy component and the acrylic component are covalently attached to, where the linking group is formed from a linking compound comprising one of the formulas:

$$R_1-CH=CH-(CH=CH)_r-(CH_2)_p-Y, \text{ or}$$

$$R_1-C\equiv C-(C\equiv C)_s-(CH_2)_p-Y,$$

wherein:
each $R_1$ independently denotes one of a hydrogen atom, a substituted or unsubstituted alkyl group, a substituted or unsubstituted cycloalkyl group, a substituted or unsubstituted aryl group, a substituted or unsubstituted alkenyl group, or a substituted or unsubstituted aromatic group;
r is 0 to 6;
s is 0 to 6;
p is 0 to 18; and
Y denotes one of a carboxylic acid group, a hydroxyl group, an amine group, an amide group, or a mercapto group.

16. A coated article comprising:
a food or beverage can end formed through deformation, including:
a metal internal surface; and
a cured coating disposed on at least a portion of the metal internal surface, the cured coating being formed from a coating composition that comprises:
a water-dispersible copolymer comprising:
an epoxy component; and
an acrylic component having a glass transition temperature raging from 90° C. to 160° C., wherein the acrylic component is prepared from a monomer mixture comprising one or more non-functional monomers and one or more acid-functional monomers;
wherein the epoxy component is covalently attached to the acrylic component with a carbon-carbon bond; and
an aqueous carrier;
wherein the cured coating exhibits an adhesion rating of at least 8 pursuant to the Adhesion Test after retort in a 0.4 weight percent citric acid solution pursuant to the Retort Method.

17. The coated article of claim 16, wherein the cured coating passes an electric current of less than 5 milliamps when tested pursuant to the Porosity Test.

18. The coated article of claim 16, wherein the cured coating exhibits an adhesion rating of at least 8 pursuant to the Adhesion Test after retort in a 2 weight percent citric acid solution pursuant to the Retort Method.

19. A method, comprising:
providing a metal substrate having a cured coating formed from a coating composition that comprises:
a water-dispersible copolymer including:
an epoxy component; and
an acrylic component having a glass transition temperature ranging from 90° C. to 160° C.;
wherein the epoxy component is covalently attached to the acrylic component with a carbon-carbon bond; and
an aqueous carrier; and
deforming at least a portion of the metal substrate into a food or beverage can end such that the cured coating is located at an internal surface of the food or beverage can end;
wherein the cured coating exhibits an adhesion rating of at least 8 pursuant to the Adhesion Test after retort in a 0.4 weight percent citric acid solution pursuant to the Retort Method.

20. The method of claim 19, wherein providing the metal substrate having the cured coating comprises:
   coating the metal substrate with the coating composition; and
   curing the coating composition to form the cured coating on the metal substrate prior to deforming at least the portion of the metal substrate into the food or beverage can end.

* * * * *